United States Patent [19]

Bilenchi et al.

[11] 4,318,569
[45] Mar. 9, 1982

[54] SEAT BACK LATCH MECHANISM

[75] Inventors: Robert Bilenchi, Dearborn Heights; Edgar G. Trudeau, Birmingham, both of Mich.

[73] Assignee: Ford Motor Company, Dearborn, Mich.

[21] Appl. No.: 819,920

[22] Filed: Jul. 28, 1977

[51] Int. Cl.³ ............................ A47C 1/00; B60N 1/04
[52] U.S. Cl. ..................................... 297/379; 297/216
[58] Field of Search ............... 297/216, 366, 367, 378, 297/379

[56] References Cited

U.S. PATENT DOCUMENTS

| | | | |
|---|---|---|---|
| 2,873,794 | 2/1959 | Leslie et al. | 297/379 |
| 3,398,987 | 8/1968 | Lynn et al. | 297/379 |
| 3,549,202 | 12/1970 | Boschen et al. | 297/379 |
| 3,674,309 | 7/1972 | Fowler | 297/379 |
| 3,900,225 | 8/1975 | Wirtz et al. | 297/367 |

Primary Examiner—William E. Lyddane
Attorney, Agent, or Firm—John J. Roethel; Clifford L. Sadler

[57] ABSTRACT

A seat back latch mechanism for a vehicle seat assembly having a generally horizontal seat structure and an upstanding backrest structure pivotally supported on support arms for tiltable movement over the seat structure. A latch pawl pivotally mounted on one of the structures is maintained in a cam controlled latching attitude relative to a fixed detent on the other of the structures. The latch pawl is constructed and arranged so that its center of gravity normally provides a force couple acting eccentrically of the pawl pivot axis to cause the latter to swing out of the controlled latching attitude in a direction to bypass the detent when moderate force is applied to the seat back structure to tilt the latter over the seat structure.

Upon the occurrence of a vehicular deceleration rate sufficient to overcome the inertia of the seat backrest structure which normally resists tilting movement of the latter over the seat structure, the inertia of the latch pawl becomes a factor in causing the latch pawl to engage the detent to prevent tilting movement of the backrest structure.

3 Claims, 4 Drawing Figures

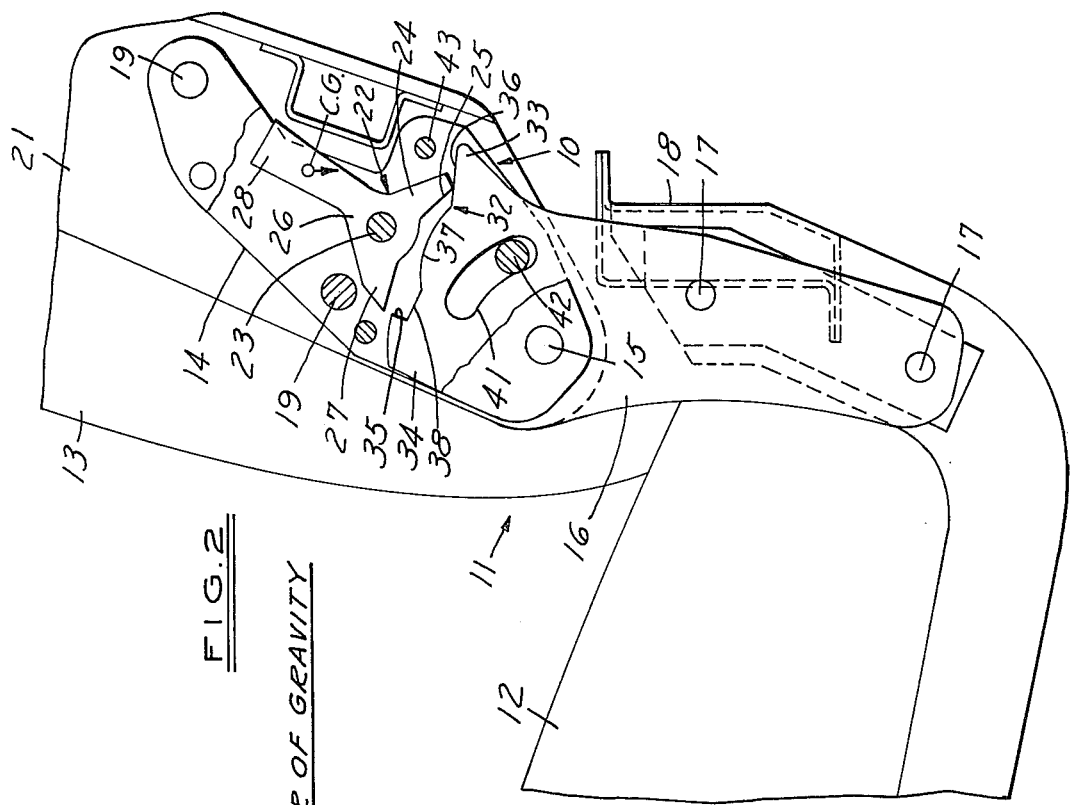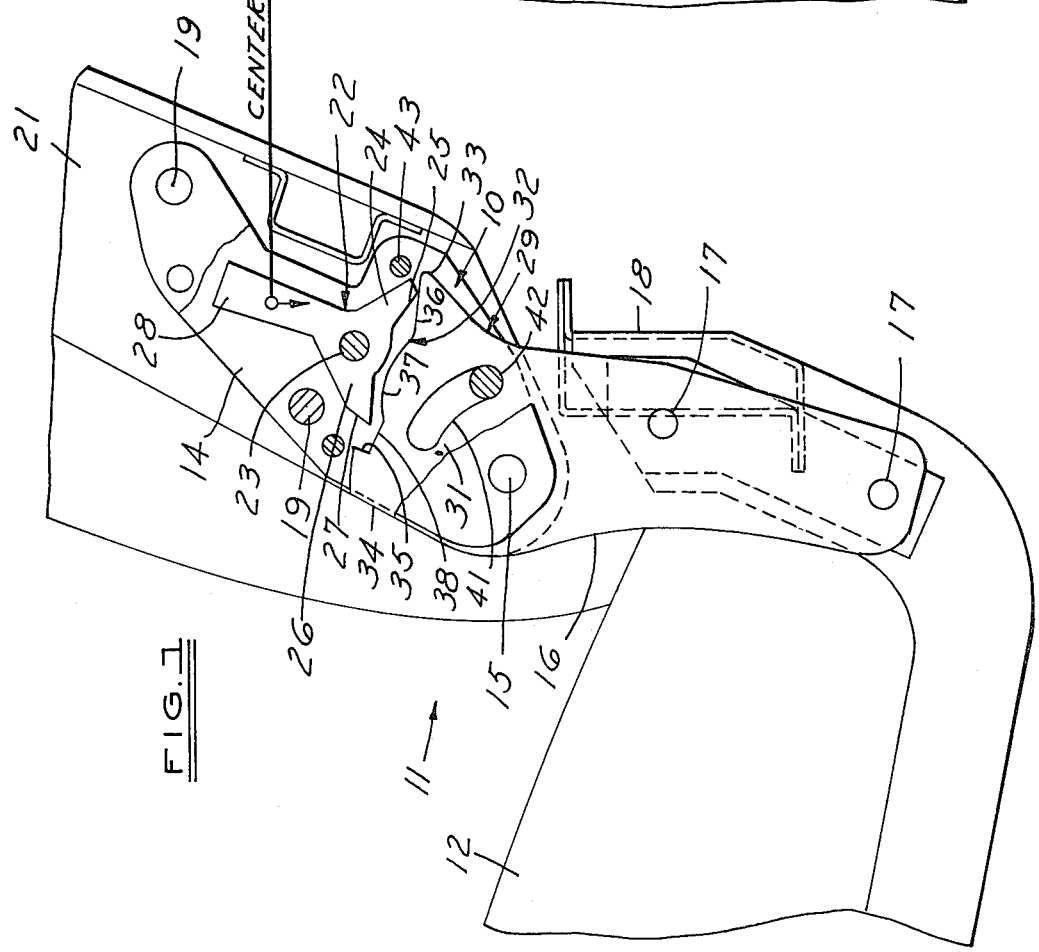

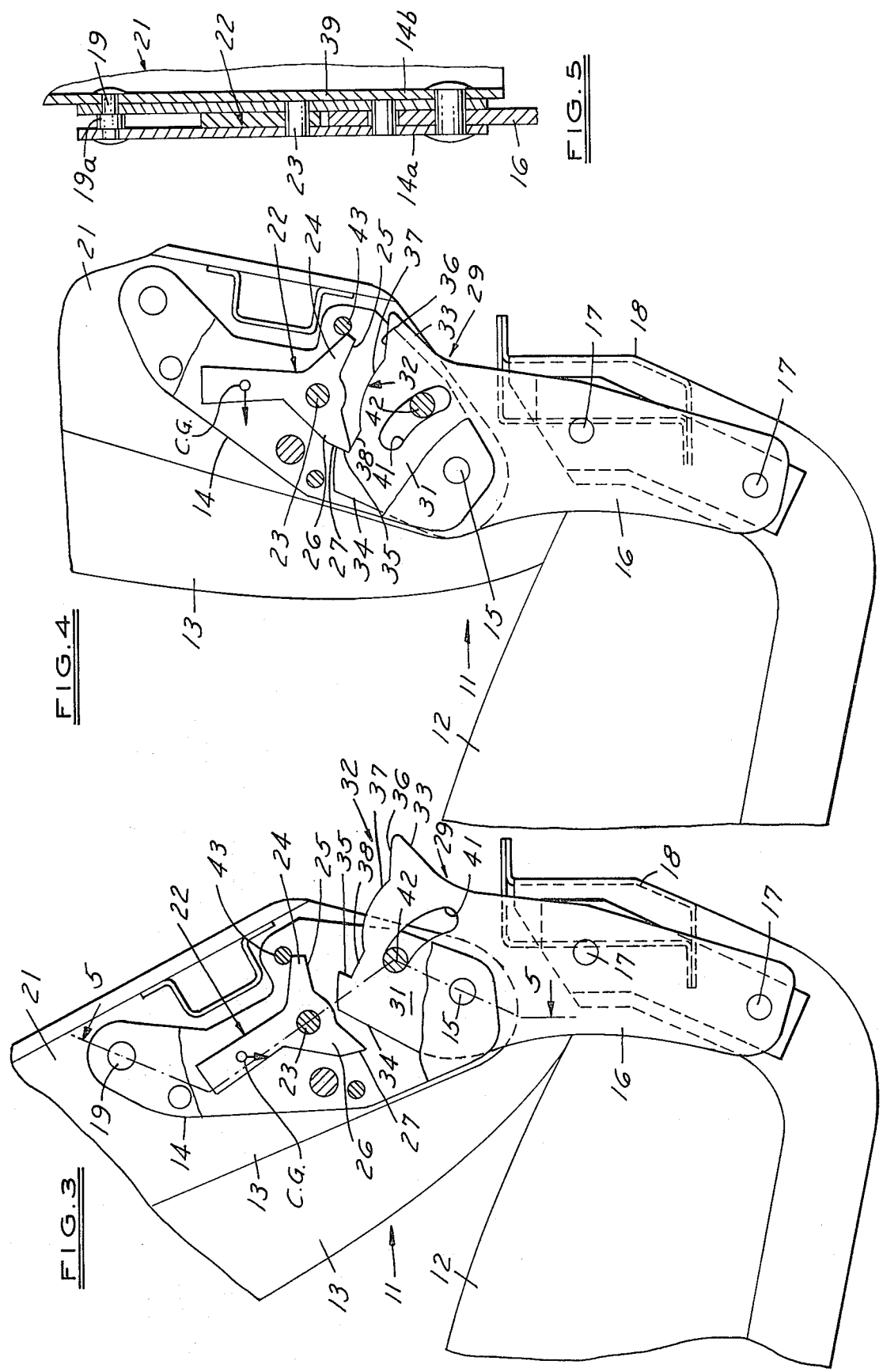

SEAT BACK LATCH MECHANISM

BACKGROUND OF THE INVENTION

The prior art, as exemplified by U.S. Pat. No. 2,873,794, issued to J. D. Leslie et al on Feb. 17, 1959 for an "INERTIA LATCH" and U.S. Pat. No. 3,549,202 issued Dec. 22, 1970 to John A. Boschen and Albert R. Close, for "SEAT BACK INERTIA LATCH", disclosed the use of inertia latch mechanisms for holding the pivoted or folding seat backrest of certain motor vehicle seat assemblies, such as those utilized in two-door models, against tiltable movement relative to the horizontal seat cushion. In such inertia latch mechanisms, the latch pawl or the like normally is positioned in a latching attitude. The inertia of the latch pawl is utilized to prevent forward tilting movement of the backrest when the deceleration rate of the vehicle exceeds a predetermined maximum, such as occurs in an accident or under "panic stop" conditions. The latching of the backrest under such conditions contributes to the stability of the seat occupant and also enables the backrest to function as a protective barrier for the rear seat occupants.

When a moderate force is applied to the backrest to tilt it forwardly, the latch pawl is moveable either by gravity or spring bias to a non-latching attitude. The backrest thus may be tilted forwardly by the application of moderate manual pressure at a low rate such as is desireable to permit ingress or egress to or from the rear seat area of the passenger compartment.

It is an object of the present invention to provide a latch pawl that is normally biased, as by gravity, into engagement with a cam means operative to control the latching attitude of the latch pawl relative to a detent, the co-action between the latch pawl and the cam means causing a positive pre-positioning of the latch pawl into latching attitude and a better controlled movement of the latch pawl into and out of latching attitude than is obtainable by known inertia latch mechanisms.

SUMMARY OF THE INVENTION

The seat back latch mechanism embodying the present invention is particularly adapted for use with a vehicle seat assembly havng a substantially horizontal seat structure and an upstanding backrest pivotally supported on support arms for tiltable movement over the seat structure. The latch mechanism comprises a latch pawl mounted on one of the structures on a pivot means permitting swinging movement about a pivot axis. The latch pawl co-acts with a latch control member mounted on the other of the structures, the control member comprising a substantially horizontal ramp having a cam portion and a detent portion. The latch pawl in normal upright position of the backrest is engaged with the latch control member cam portion and is maintained by the cam portion in latching attitude relative to the latch control member detent portion. This is achieved by constructing and arranging the latch pawl so that its center of gravity provides a force couple acting eccentrically of the pawl pivot axis, a part of the pawl having abutting engagement with the control member cam portion. The cam portion is contoured to guide the latching pawl so that the latter will swing out of latching engagement in a direction to bypass the detent portion upon a moderate manual force being applied to the backrest structure to tilt the latter over the seat structure. When a vehicle is at rest or is accelerating or decelerating at a reasonable rate, the inertia of the backrest structure normally resists tilting movement of the latter over the seat structure. Upon the occurrence of vehicular deceleration rate sufficient to overcome the backrest structure inertia, the inertia of the latch pawl becomes a factor in causing the latch pawl to become disengaged from the cam guide portion and to cause the latch pawl to maintain its latching attitude whereby the latter remains operative to engage the detent portion and prevent tilting movement of the backrest structure.

DESCRIPTION OF THE DRAWINGS

Other objects, advantages and features of the present invention can be made more apparent as this description proceeds, reference being made to the accompanying drawings, wherein:

FIG. 1 is a partial side view of a motor vehicle seat assembly having a generally horizontal seat structure and an upstanding backrest structure pivotally supported on support arms for tiltable movement over the seat structure, and further having a latch mechanism constructed in accordance with the present invention mounted thereon;

FIGS. 2, 3, 4 and 5 are views in part similar to FIG. 1 showing the latch mechanism in different operative positions; and FIG. 5 is a section view on the line 5—5 of FIG. 3.

DETAILED DESCRIPTION OF THE INVENTION

Referring now to the drawings, and in particular to FIG. 1, there is illustrated a seat back latch mechanism, generally designated 10, mounted on a seat assembly 11, only one side of which is visible. The seat assembly 11 has a substantially horizontal seat structure 12 and an upstanding backrest structure 13. The backrest structure 13 is supported on swingable support arms 14, only one of which is visible, each arm 14 being pivotally mounted on a pivot pin 15 intermediate the ends of a vertically elongated lower arm 16 attached by rivets 17 or the like to a support plate secured to the frame structure 18 of the seat structure 12. Each support arm 14 is riveted or bolted by fastening devices 19 to the frame structure 21 of the backrest structure 13.

The latch mechanism 10 comprises a generally trifurcated latch pawl 22 mounted intermediate the vertical ends of the support arm 14 for swinging movement about a pivot axis provided by a pivot pin 23. As viewed in FIG. 1, which represents the normal relalationship of the seat assembly components with the backrest structure at rest in an upstanding position, the pivot pin 23 is located above and slightly to the rear of the pivot pin 15 mounting the support arm 14 on the lower arm 16. Thus, the pivot axis of the pawl 22 is located above and slightly to the rear of the pivot axis about which the backrest structure is swingable.

The three arms or branches of the trifurcated pawl 22 comprise a rearwardly extending arm 24 terminating in an end portion 25, a forwardly extending arm 26 terminating in an end portion 27 and a substantially upstanding arm 28.

Mounted on the seat structure beneath and adjacent the latch pawl 22 is a latch pawl movement control member 29. As shown in the drawings, the control member is an extension of the lower arm 16 and, for purposes of definition, is considered as comprising a planar body portion 31 of the latter extending from about the level of the pivot pin 15 upwardly toward the latch pawl 22. The extension or planar body portion may be integral with the support arm 16 as shown or it may be a separate member suitably appended to the support arm 16 in any convenient manner. In either case, the planar body portion 31 substantially parallels the plane of swinging movement of the support arm 14.

At its upper edge, the control member body portion comprises a substantially horizontally extending ramp having a cam surface 32 beginning at the rear edge 33 and extending toward the front edge 34 where it terminates in a detent portion 35. The cam surface 32 has a ramp section 36 adjacent the body portion edge 33 which blends into a curved or arcuate intermediate section 37 leading to a flat section 38.

As best seen in FIG. 5, the support arm 16 comprises a single thickness of metal while the support arm 14 comprises two spaced plates 14a and 14b straddling the upper or planar body portion 31 of the support arm 16. The latch pawl 22 is interposed between the plates 14a and 14b. It will be noted that the fasteners 19 securing the upper arm 14 to the backrest frame sheet metal 39 have a spacer portion 19a to maintain plates 14a and 14b in proper spaced relation to each other to permit the latch pawl 22 to swing freely therebetween.

The planar body portion 31 has an arcuate slot 41 extending radially about the pivot pin 15. A pin 42 extending between the plates 14a and 14b is movable from one end of the slot 41 as the backrest is tilted from a normal upstanding position as in FIG. 1 to a position overlying the seat cushion as in FIG. 3. The pin 42 and slot 41 provides stops limiting the movement of the backrest in each direction of tilt.

One additional stop 43 is positioned on the upper support arm 14 to limit the swinging movement of the latch pawl 22 in a counterclockwise direction as viewed in the drawings. The necessity of this stop 43 will become apparent as the description proceeds.

FIGS. 1, 2 and 3 illustrate the following operative positions of the latching mechanism 10: (1) Latching mechanism attitude when the backrest is in normal upright position; (2) latching mechanism attitude during the folding or tilting cycle of the backrest; and (3) latching mechanism at end of folding cycle.

Referring to FIG. 1, the center of gravity, as indicated by the legend "Center of Gravity", of the latching pawl 22 is behind its pivot 23 and thus creates a force couple tending to swing the latching pawl in a clockwise direction. The end portion 25 of the pawl arm 24 engages the surface of the intermediate section 36 of the ramp surface 32 of the control member body portion 31. In this position, the end portion 27 of the pawl arm 26 is in alignment with the detent 35 for ready engagement under predetermined deceleration of the vehicle.

When the backrest is rotated in a tilted direction over the horizontal seat structure 12, as by the application of moderate manual force when it is desired to provide easier ingress or egress to the rear passenger compartment, the ramp, in effect, drops away from the pawl arm end portion 25. Stated another way, the pawl pivot 23 is raised relative to the cam surface 32. The center of gravity of the latch pawl 22 causes the latter to rotate in a clockwise direction as the end portion 25 attempts to follow the cam surface 32. This rotation causes the end portion 27 of the pawl arm 26 to move upwardly above the detent 35 and, therefore, out of alignment with the latter as shown in FIG. 2. This movement of the pawl allows the backrest structure 13 to be tilted over the seat structure within the limits of movement permitted by the pin 42 moving within the slot 41. As this occurs, the center of gravity of the pawl 22 passes over the pawl pivot 23 causing the pawl to swing in counterclockwise direction and to assume the position shown in FIG. 3. Counterclockwise movement of the pawl is limited by the engagement of the end 25 of the pawl arm 24 with the stop 43.

FIG. 4 illustrates the attitude of the latching pawl 22 upon rapid deceleration of the vehicle as occurs under panic stop or frontal impact conditions. During rapid deceleration of the vehicle, the backrest will start to rotate in a counterclockwise direction. Because of the location of the center of gravity of the latching pawl, a second force couple is created as indicated by the horizontal vector. This second force couple is substantially greater than the force couple normally tending to rotate the latching pawl 22 in a clockwise direction, see FIG. 1. The second force couple rotates the locking pawl in a counterclockwise direction causing it to remain in locking orientation, end portion 27 in engagement with detent 35, so as to lock the backrest against tilting movement over the seat structure.

If the backrest should bounce to its rest or upright position after latching once and then rebound into a tilted attitude, the cam surface will have again pre-positioned the pawl into a latching orientation ready to engage the detent once again. Although vehicle deceleration may have ceased by the time rebounding takes place, the tilting motion occurs fast enough so there is insufficient time for the pawl end portion 25 to follow the cam surface 32 and to avoid engagement of the pawl with the detent.

It will be understood that the invention is not to be limited to the exact construction shown and described, but that various changes and modifications may be made without departing from the spirit and scope of the invention as defined in the appended claims.

We claim:

1. A seat back latch mechanism for a vehicle seat assembly having a substantially horizontal seat structure and an upstanding backrest structure pivotally supported on support arms for tiltable movement over the seat structure, the latch mechanism comprising:

a latch pawl having first, second and third arms, pivot means on the backrest structure mounting the latch pawl for swinging movement about a pivot axis, the latch pawl arms extending substantially radially from the pivot axis, and a latch control member mounted on the seat structure, the latch control member comprising a substantially horizontally extending ramp having at one end a cam portion and terminating at its other end in a detent portion, in normal upright position of the backrest structure an end portion of the first arm being engaged with the cam portion to maintain an end portion of the second arm in latching attitude relative to the ramp detent portion, the latch pawl third arm extending upwardly from the juncture of the first and second arms with its center of gravity offset relative to the latch pawl pivot axis to create a force couple acting eccentrically of the pivot axis to maintain engagement of the latch pawl with the cam portion as the latch pawl moves across the latch control member ramp during the application of a moderate tilting force to the backrest structure, the cam portion being contoured to rock the latch pawl in a direction to swing the second arm end portion out of latching attitude in a direction to bypass the detent portion, and upon the occurrence of a high vehicular deceleration rate sufficient to overcome the inertia of the backrest structure normally resisting tilting movement of the latter over the seat structure, the inertia of the latch pawl becoming a factor in causing disengagement of the latch pawl first arm end portion from the ramp cam portion while maintaining the second arm end portion in its latching attitude relative to the ramp detent portion whereby the pawl is operative to prevent tilting movement of the backrest structure.

2. A seat back latch mechanism for a vehicle seat assembly having a substantially horizontal seat structure and an upstanding backrest structure supported on swingable support arms pivotally mounted on the seat structure for tiltable movement over the latter, the latch mechanism comprising:

a latch pawl pivotally mounted on one of the support arms for swinging movement about a pivot axis located above the pivotal mounting of the support arms, the latch pawl comprising a trifurcated member having first, second and third arms arranged in a substantially inverted Y-shaped configuration with the pivot axis being located at substantially the conjunction of the three arms, a latch pawl movement control member mounted on the seat structure beneath and adjacent the latch pawl and having a substantially planar body portion paralleling the plane of swinging movement of the one support arm carrying the latch pawl, the control member having a substantially horizontal ramp on its upper edge having a cam portion beginning at one edge of the planar body portion and terminating at the other edge in a detent portion, in normal upright position of the backrest structure an end portion of the first arm being engaged with the cam portion to maintain an end portion of the second arm in latching attitude relative to the ramp detent portion, the latch pawl third arm extending upwardly from the juncture of the first and second arms with its center of gravity offset relative to the latch pawl pivot axis to create a force couple acting in a direction eccentrically of the pivot axis to maintain engagement of the latch pawl with the cam portion as the latch pawl moves across the latch control member ramp during the application of moderate tilting force to the backrest structure, the cam portion being contoured to rock the latch pawl in a direction to swing the second arm end portion out of latching attitude relative to the detent portion during moderate tilting of the backrest structure, and upon the occurrence of a high vehicular deceleration rate sufficient to overcome the inertia of the backrest structure normally resisting tilting movement of the latter over the seat structure, a force couple being created which is greater than and acts in a direction opposite to the direction of the first mentioned force couple to cause the latch pawl first arm end portion to be lifted from the cam portion while maintaining the latch pawl second arm portion in latching attitude whereby the latter is operative to engage the detent portion to prevent tilting movement of the backrest structure.

3. A seat back latch mechanism for a vehicle seat assembly having a substantially horizontal seat structure and an upstanding backrest structure pivotally supported on support arms for tiltable movement over the seat structure, the latch mechanism comprising:

a latch pawl having first, second and third arms, pivot means on the backrest structure mounting the latch pawl for swinging movement about a pivot axis, the latch pawl arms extending substantially radially from the pivot axis, and a latch control member mounted on the seat structure, the latch control member comprising a substantially horizontally extending ramp having at one end a cam portion and terminating at its other end in a detent portion, in normal upright position of the backrest structure an end portion of the first arm being engaged with the cam portion to maintain an end portion of the second arm in latching attitude relative to the ramp detent portion, the latch pawl third arm extending upwardly from the juncture of the first and second arms with its center of gravity offset relative to the latch pawl pivot axis to create a force couple acting eccentrically of the pivot axis to maintain engagement of the latch pawl with the cam portion as the latch pawl moves across the latch control member ramp during the application of a moderate tilting force to the backrest structure, the cam portion being contoured to rock the latch pawl in a direction to swing the second arm end portion out of latching attitude in a direction to bypass the detent portion, upon occurrence of a high vehicular deceleration rate the normal at rest inertia of the latch pawl is overcome creating a force couple greater than and acting opposite to the first mentioned force couple to swing the latch pawl in a direction so that the first arm end portion is lifted from the cam portion and the second arm end portion is maintained in latching attitude as the backrest structure tries to tilt over the seat structure, thereby abruptly terminating any tilting movement upon engagement of the second arm end portion with the ramp detent portion.

* * * * *